US010408670B2

(12) United States Patent
Holcomb

(10) Patent No.: US 10,408,670 B2
(45) Date of Patent: Sep. 10, 2019

(54) APPARATUS AND METHOD FOR DETECTING MULTIPLE WORKPIECES

(71) Applicant: Norgren Automation Solutions, LLC, Saline, MI (US)

(72) Inventor: Mark Holcomb, Tecumseh, MI (US)

(73) Assignee: Norgren Automation Solutions, LLC, Saline, MI (US)

( * ) Notice: Subject to any disclaimer, the term of this patent is extended or adjusted under 35 U.S.C. 154(b) by 562 days.

(21) Appl. No.: 14/973,175

(22) Filed: Dec. 17, 2015

(65) Prior Publication Data

US 2016/0178430 A1 Jun. 23, 2016

Related U.S. Application Data

(60) Provisional application No. 62/092,874, filed on Dec. 17, 2014.

(51) Int. Cl.
| | |
|---|---|
| *B25J 19/00* | (2006.01) |
| *G01G 19/52* | (2006.01) |
| *B25J 19/02* | (2006.01) |
| *G01G 3/14* | (2006.01) |
| *G01G 23/10* | (2006.01) |
| *G01L 5/00* | (2006.01) |

(52) U.S. Cl.
CPC ............. *G01G 19/52* (2013.01); *B25J 19/02* (2013.01); *G01G 3/1414* (2013.01); *G01G 23/10* (2013.01); *G01L 5/009* (2013.01)

(58) Field of Classification Search
USPC .................................................. 700/245–264
See application file for complete search history.

(56) References Cited

U.S. PATENT DOCUMENTS

| | | | | | |
|---|---|---|---|---|---|
| 3,826,485 | A | * | 7/1974 | Shindo ................. | B65H 3/0816 |
| | | | | | 271/106 |
| 3,933,388 | A | * | 1/1976 | Conboy ................ | B66C 1/0212 |
| | | | | | 294/185 |
| 4,971,515 | A | * | 11/1990 | Pol ......................... | B21D 43/18 |
| | | | | | 271/262 |

(Continued)

FOREIGN PATENT DOCUMENTS

| | | |
|---|---|---|
| EP | 2 759 815 | 7/2014 |
| JP | S57211494 A | 12/1982 |

(Continued)

*Primary Examiner* — Jonathan L Sample
(74) *Attorney, Agent, or Firm* — Young Basile Hanlon & MacFarlane, P.C.

(57) ABSTRACT

An apparatus and method is provided for detecting multiple workpieces. The present invention provides a mount adaptor connected to a workpiece engaging device for engaging and manipulating a workpiece. A cell body is connected to the mount adaptor, and the cell body has an accelerometer disposed therein for measuring and signaling an acceleration value of the workpiece. A load cell is connected to the cell body and is connectable to a manipulator, wherein the load cell measures and signals a load value of the workpiece. A computer processor receives the acceleration value and the load value of the workpiece for determining the mass of the workpiece and determining whether there are multiple workpieces engaged by the workpiece-engaging device.

20 Claims, 5 Drawing Sheets

(56) References Cited

U.S. PATENT DOCUMENTS

| | | | | |
|---|---|---|---|---|
| 6,192,297 B1* | 2/2001 | Marobin | | B25J 9/1666 29/17.1 |
| 6,652,217 B2* | 11/2003 | Dettman | | B21D 43/20 271/104 |
| 6,719,826 B2 | 4/2004 | Gessler | | |
| 6,817,639 B2* | 11/2004 | Schmalz | | B25B 11/005 294/185 |
| 8,000,837 B2* | 8/2011 | Allen | | B65G 61/00 209/534 |
| 8,070,203 B2* | 12/2011 | Schaumberger | | B66C 1/0218 294/183 |
| 8,704,111 B2* | 4/2014 | Tanaka | | B25J 15/0616 177/245 |
| 8,977,388 B2* | 3/2015 | Jacobsen | | B25J 3/04 318/568.22 |
| 2001/0037960 A1* | 11/2001 | Ratesic | | G01G 13/22 209/592 |
| 2002/0152783 A1* | 10/2002 | Kleber | | B21D 26/055 72/60 |
| 2004/0195310 A1* | 10/2004 | Silverbrook | | G06F 3/014 235/375 |
| 2006/0184282 A1* | 8/2006 | Strasser | | B65H 7/12 700/258 |
| 2010/0274390 A1* | 10/2010 | Walser | | B25J 9/1697 700/259 |
| 2012/0072021 A1* | 3/2012 | Walser | | B25J 9/1697 700/254 |
| 2013/0061695 A1* | 3/2013 | Sato | | B25J 13/085 73/865 |
| 2013/0079928 A1* | 3/2013 | Soe-Knudsen | | B25J 9/1656 700/248 |
| 2013/0345872 A1* | 12/2013 | Brooks | | B25J 9/0087 700/259 |
| 2014/0316572 A1* | 10/2014 | Iwatake | | B25J 9/1633 700/258 |
| 2015/0266184 A1* | 9/2015 | Arakawa | | G01L 5/167 700/258 |
| 2016/0031078 A1* | 2/2016 | Kapoor | | G05B 19/427 700/258 |
| 2016/0121482 A1* | 5/2016 | Bostick | | G05D 1/0016 700/257 |

FOREIGN PATENT DOCUMENTS

| | | |
|---|---|---|
| JP | H03-19783 A | 1/1991 |
| JP | H05-38689 A | 2/1993 |
| JP | H06-305608 A | 11/1994 |
| JP | 2001-239480 A | 9/2001 |
| JP | 2002195895 A | 7/2002 |
| JP | 2013-56402 A | 3/2013 |
| JP | 2013-79931 A | 5/2013 |

* cited by examiner

APPARATUS AND METHOD FOR DETECTING MULTIPLE WORKPIECES

CROSS-REFERENCE TO RELATED APPLICATION(S)

This application claims priority to and the benefit of U.S. Provisional Patent Application No. 62/092,874, filed Dec. 17, 2014, the entire disclosure of which is incorporated by reference herein.

FIELD OF THE INVENTION

The present invention relates to a system, apparatus, and method for detecting multiple workpieces and, in particular, a manufacturing system, an evaluation system, an apparatus, and method for detecting the mass of a workpiece to determine whether one workpiece or more than one workpiece is being lifted by the manufacturing system.

BACKGROUND OF THE INVENTION

The manufacturing process of stamping, forming, and assembling sheet metal workpieces often requires picking a single piece of sheet metal automatically from a stack of workpieces and loading the workpiece into a machine for processing. The sheet metal workpieces may be blanks picked up from a stack of blanks for loading into a first machine in a line of subsequent stamping, forming, or other operations. Alternatively, the sheet metal workpieces may already be stamped to form a stack of identical workpieces which are loaded into another machine. Though some processes manually pick the top sheet from a stack of blanks or workpieces, the present invention relates to an automated process for engaging and manipulating the blank workpieces.

Automated processes for picking a workpiece from a stack of blank workpieces may include various forms of programmable robotic manipulators for picking and moving the blank workpiece from a first workstation and placing the blank workpiece into a second workstation. Such automated processes for manipulating parts typically require an end-of-arm tool, which grips, holds, and releases the workpiece so that the manipulator can pick the top workpiece from the stack of workpieces and move it to its destination. A common and typical end-of-arm tool for such applications is a vacuum suction cup which utilizes compressed air and a vacuum pump or venturi-type vacuum-generating device to create vacuum within the suction cup. Rubber suction cups are utilized to contact and adhere to the blank workpiece due to the vacuum created in the vacuum cup. Once the manipulator has picked and moved the blank workpiece to its destination, the pressure in the vacuum cup is reversed, and the blank workpiece is "blown off" or released from the suction cups.

Occasionally, the manipulator picks a blank workpiece from the stack, and the next blank workpiece in the stack sticks to the first blank workpiece. This is referred to as a "double blank" condition. Factors that can cause the blank workpieces to stick together include oil or other substances, corrosion, dirt, and static electricity that may form on the workpieces. Mechanical interlocking of small metal burrs, especially on processed parts, may also cause a double blank condition. If stamping, forming, welding, or other processes call for a single blank workpiece, loading a double blank or multiple workpieces into such processes would be undesirable, as such a condition may cause damage to machinery and tooling as well as create damaged workpieces. Damaged machinery and equipment, as well as scrap workpieces, create inefficiencies that are undesirable in an industrial environment. The challenge of preventing a double blank workpiece from being loaded into a subsequent process is a major problem for the metal forming industry and other industries that handle substantially flat sheets of material.

Certain processes and equipment have been developed in the past to address this problem. For instance, powerful magnets have been utilized within close proximity of the edge of stacked workpieces. The magnets cause the rest of the stack to repel the top blank workpiece in the stack. However, such magnets only work with steel or other magnetic material and not aluminum, plastic, or other non-magnetic material.

Air knives have also been utilized in an attempt to resolve the above-noted problem. Air knives are nozzles that direct a high-pressure stream of air at the edge of the blank workpieces to displace the parts with air pressure by breaking the bond between the top blank and the adjacent blank underneath the top blank. However, the application of air knives in these situations is not consistent and not always successful.

Other electronic sensing means or devices have also been utilized to detect double blank workpieces. These electronic sensing devices are typically mounted on the end-of-arm tool, wherein the face of the sensor is forced flush with the surface of the blank workpiece so as to electronically detect if two blank workpieces are present. Again, these devices can be inconsistent in their results, while also requiring additional costs to the end-of-arm tool in that the electronic sensing device must be mounted within, and therefore sold as part of, the end-of-arm tool.

It would be desirable to provide an apparatus and method for detecting a double blank workpiece condition or multiple workpieces that is accurate and consistent without adding cost to the end-of-arm tool.

SUMMARY OF THE INVENTION

The present invention relates to an apparatus and method for detecting multiple workpieces. The present invention includes a mount adaptor connectable to a workpiece engaging device for engaging and manipulating a workpiece. A cell body may be connected to the mount adaptor, wherein the cell body has an accelerometer disposed therein for measuring and signaling the acceleration value of the workpiece. A load cell may be connected to the cell body and connectable to a manipulator, wherein the load cell measures and signals the load value of the workpiece. A computer processor may receive the acceleration value and the load value of the workpiece and determine whether there are multiple workpieces engaged by the workpiece-engaging device.

According to another aspect, an apparatus for detecting workpieces includes a body, an accelerometer, a force sensor, and a local processor. The body includes a first end configured to couple to the manipulator and includes a second end configured to couple to the lifting tool. The accelerometer is coupled to the body and is configured to measure local acceleration of the body and send a local acceleration signal indicative of the local acceleration. The force sensor is coupled to the body and is configured to measure local force applied to the body by the lifting tool and to send a local force signal indicative of the local force. The local processor is coupled to the body and is electrically connected to the accelerometer and the force sensor to receive the local acceleration signal and the local force signal. The local processor is configured to determine a local mass value based on the local acceleration signal and the local force signal and to send a local mass signal indicative of the local mass value.

A manufacturing system is provided for evaluating one or more workpieces lifted by a manipulator with a plurality of lifting tools. The manufacturing system includes a plurality of apparatuses and one or more processors. Each apparatus includes a body, an accelerometer, and a force sensor. The body includes a first end configured to couple to the manipulator and includes a second end configured to couple to the lifting tool. The accelerometer is coupled to the body and is configured to measure local acceleration of the body and send a local acceleration signal indicative of the local acceleration. The force sensor is coupled to the body and is configured to measure local force applied to the body by the lifting tool and to send a local force signal indicative of the local force. The one or more processors are configured to determine a local mass value for each apparatus based on the local acceleration signal and the local force signal and to determine a total mass value by summing the local mass values from each apparatus.

A method is provided for processing one or more workpieces with a manipulator and a plurality of lifting tools mounted to the manipulator. First and second steps of the method require, for each lifting tool, measuring a local acceleration and a local force during movement of the one or more workpieces being moved by the lifting tools. A third step of the method requires, for each lifting tool, determining a local mass value based on the local acceleration and the local force. A fourth step of the method requires determining a total mass value by adding the local mass value for each lifting tool. A fifth step requires comparing the total mass value to a target to make a determination of whether more than one workpiece is currently being lifted by the lifting tools. A sixth step requires, if it is determined that more than one workpiece is currently being lifted, rejecting the workpieces currently being lifted.

BRIEF DESCRIPTION OF THE DRAWINGS

The various features, advantages and other uses of the present apparatus and method will become more apparent by referring to the following detailed description and drawings in which.

DETAILED DESCRIPTION OF THE EMBODIMENT

Figure 1:
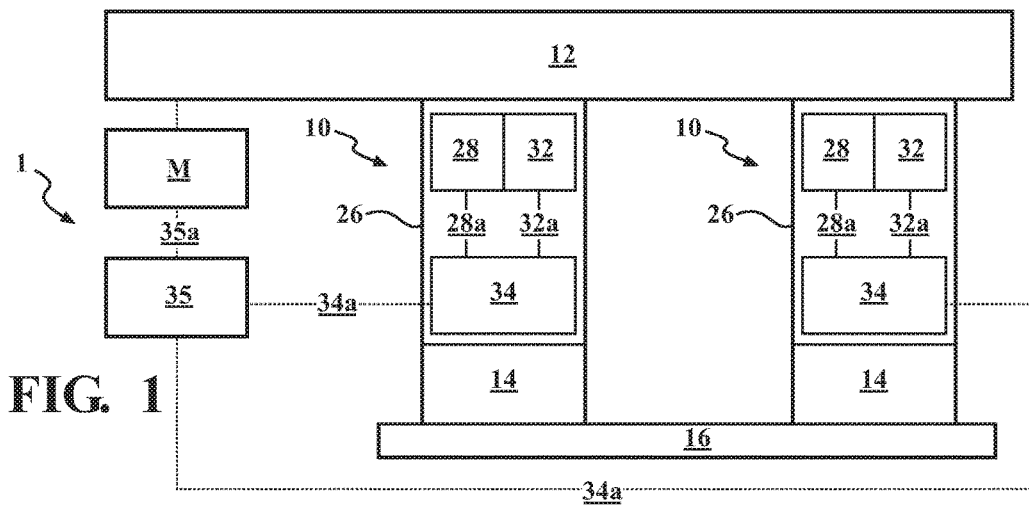
FIG. 1 is a schematic view of a system for detecting multiple workpieces, which comprises apparatuses according to the present invention.

The present invention relates to systems, apparatuses, and methods for detecting multiple workpieces, as exhibited in FIGS. 1-6. In these figures, primary components or features having similar functionality across the various embodiments are discussed and depicted with reference numerals increasing by 100 (e.g., apparatus 10, accelerometer 28, and force sensor 32 in FIGS. 1 and 3, and apparatus 110, accelerometer 128, and force sensor 132 in FIG. 4).

As discussed in further detail below, the weight detection system 1 includes one or more apparatuses 10. The apparatus 10 (e.g., coupling) of the present invention may be connected to a manipulator 12, such as a programmable robotic arm (e.g., manipulator arm), at one end of the apparatus 10 while also being connected to an end-of-arm tool 14 (e.g., workpiece engaging, workpiece lifting, workpiece moving tool or device, etc.) for engaging a workpiece 16 at the opposite end of the apparatus 10. Each apparatus 10 may function as a coupling, which releasably mounts the end-of-arm tool 14 to the manipulator 12, or may include and be fixedly coupled to the end-of-arm tool 14. Each apparatus 10, or a central processor 35, is further configured to determine the local mass or weight of the workpiece 16 being lifted by the end-of-arm tool 14 associated therewith, while the workpiece 16 is in motion. The local mass of the workpiece 16 is derived from the local acceleration measured by the apparatus 10 and from the local force applied by the workpiece to the apparatus 10 via the end-of-arm tool 14, such local force also being measured by the apparatus 10. Based on the one or more local masses determined with the apparatuses 10, the system 1 assesses whether one workpiece 16 or more than one workpiece 16 is being lifted by the end-of-arm tools 14 associated with the apparatuses 10 of the system 1.

Figure 3:
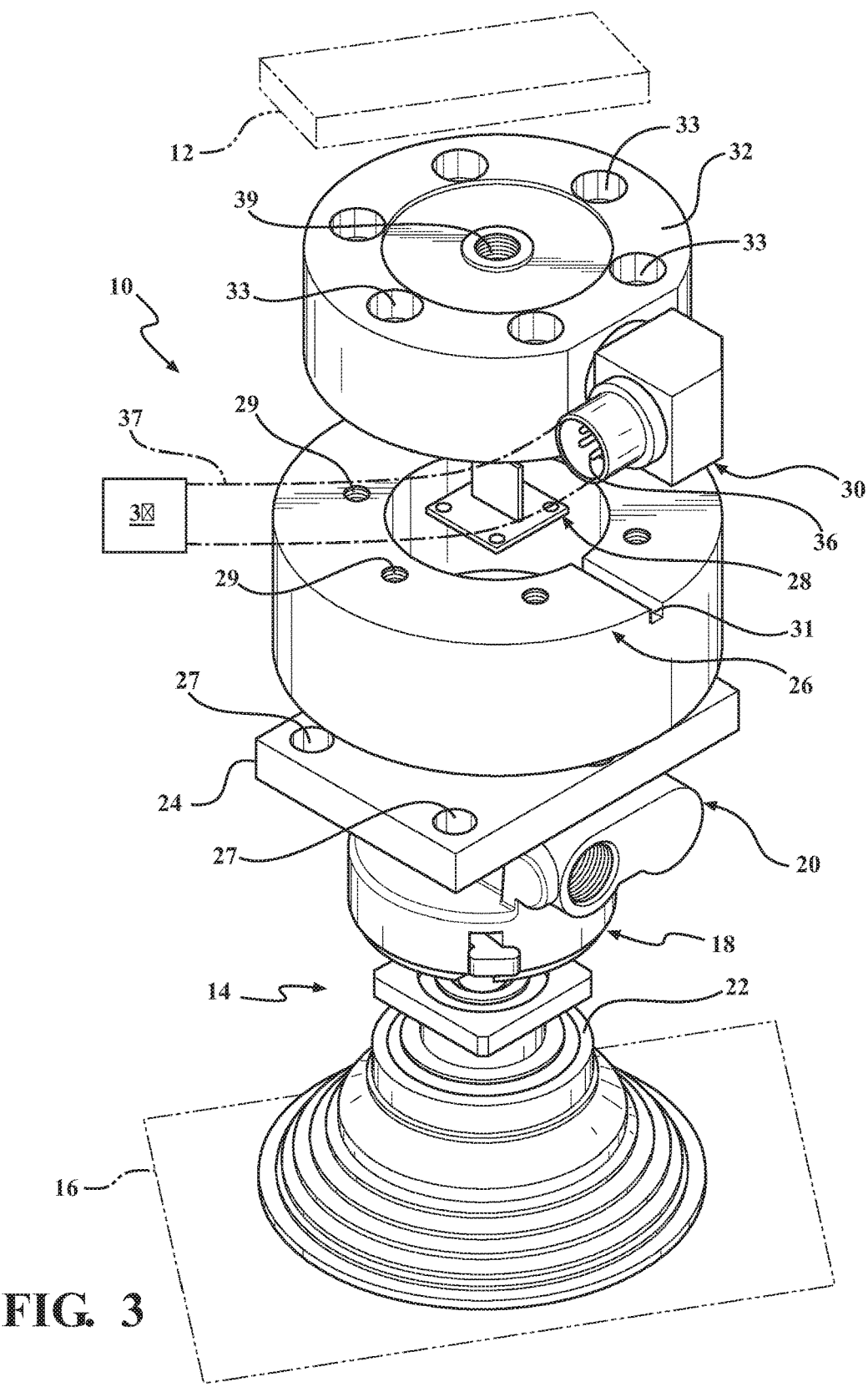
FIG. 3 is an exploded perspective view of the apparatus for detecting multiple workpieces of the present invention.

As shown in FIG. 3, the end-of-arm tool 14 may comprise a vacuum cup apparatus 18 having a venturi 20 for generating vacuum in an elastic vacuum cup 22. The vacuum cup 22 may engage the workpiece 16 directly, wherein the workpiece 16 may include cut sheets of metal or other materials which are commonly referred to as "blanks." The workpieces 16 or blanks may be previously stamped or processed as identical parts, or the workpieces 16 or blanks may include substantially flat sheets of metallic or non-metallic materials. The workpieces 16 or blanks are normally stacked directly on top of each other, wherein the manipulator 12 moves the vacuum cup 22 into a position, and the vacuum cup 22 engages the workpiece 16 or blank that is on the top of the stack of workpieces 16 or blanks. The stack of workpieces 16 or blanks may be stored or held in a workstation (not shown). The workstation may be configured of various different types of stations for further processing of the workpieces 16.

When referring to the stack of workpieces 16 or blanks, the "top" blank is the exposed or uppermost blank of a stack of blanks at any given time. Thus, when the top blank is removed from the stack (assuming only one blank is removed), the blank immediately below the top blank becomes the top blank. Keeping the stack vertical and removing the uppermost blank is conventional and preferred, but in theory, the blanks could be mounted horizontally with the top blank removed from an end of the stack. Likewise, it is possible to remove the bottom blank, assuming unimpeded access to that blank if the stack can be secured and if the system could remove only one blank or an occasional double blank. A double blank shall refer to a pair of blanks or workpieces 16 stuck together when engaged and moved by the vacuum cup 22 and the manipulator 12. The blanks or workpieces 16 may stick together due to various coatings, oils, dirt, indentations in the blanks, etc. Double blanks or workpieces 16 are undesirable in an industrial environment, as the machinery for processing and forming the blanks is not designed for double blanks or workpieces 16. Thus, the insertion of double blanks or workpieces 16 into the appropriate machinery may damage the machinery or produce faulty parts. Such situations are, of course, undesirable in an industrial environment.

To determine whether one or more workpieces 16 are attached to the end-of-arm tool 14, i.e., a double blank condition, the mass of the workpiece 16 is compared to the theoretical mass of one workpiece 16. The problem with simply comparing the mass value to the theoretical mass of one workpiece 16 is that the apparent mass of the workpiece 16 is dynamic when the end-of-arm tool 14 and the workpiece 16 are in motion. Typically, a proper mass measurement of the workpiece 16 cannot be made until the end-of-arm tool 14 has lifted the workpiece 16 off of the stack of workpieces 16 and has come to rest. In such situations, a double blank condition cannot be determined until the end-of-arm tool 14 and the workpiece 16 have come to rest. This wait time causes a slowdown in the processing of the workpiece 16, thereby creating inefficiencies in the manufacturing process that are undesirable in an industrial application.

The apparent mass of the workpiece 16 changes as it accelerates and decelerates during the lifting of the workpiece 16 from the stack of workpieces 16. The force which the workpiece 16 exerts downward, which is the load of the workpiece 16, is the product of the mass of the workpiece 16 and the acceleration of the workpiece 16. At rest, the acceleration is simply the local gravitational acceleration. During the lifting of the workpiece 16, the acceleration is the vector sum of the gravitational acceleration and the acceleration of the end-of-arm tool 14. The acceleration value allows the mass of the workpiece 16 to be determined throughout the lifting of the workpiece 16 by using the equation Mass=Force/Acceleration. As can be seen from the equation, during the lifting of the workpiece 16, the measured load value and the acceleration value increase proportionally, yielding a mass of the workpiece 16 that is relatively constant throughout the lifting of the workpiece 16. By comparing the calculated mass to the theoretical mass of one workpiece 16, the apparatus 10 and method of the present invention can determine whether more than one workpiece 16 is present on the end-of-arm tool 14. In other words, the apparatus 10 and method of the present invention can determine whether a double blank condition has occurred. If a double blank condition is identified, the manipulator 12 may be programmed to unload the workpieces 16 in a separate unloading station, or the computer processor 34 may provide a warning or an indicator to a user to unload the workpieces 16.

It should be noted that during the deceleration of the workpiece 16, the force and acceleration of the workpiece 16 can become zero, indicating that the workpiece 16 is momentarily weightless. This will lead to a "Divide By Zero" error, thereby creating erratic math calculations during this time period. However, by the time this condition occurs, the mass of the workpiece 16 has already been determined by the apparatus 10 and method of the present invention. Thus, the necessary calculations must avoid conditions where the acceleration approaches zero. A simple threshold can be established below which calculations are not made.

In most applications, a plurality of end-of-arm tools 14 are used to engage a workpiece 16 since many of the workpieces 16 are too large or heavy for one end-of-arm tool 14 to lift and manipulate. In those situations, the system 1 includes one apparatus 10 of the present invention utilized in conjunction with each end-of-arm tool 14. The distributed or local mass on each end-of-arm tool 14 may be added in order to provide a total mass of the workpiece 16. Again, by using an accelerometer value in conjunction with a load or force value of the workpiece 16, the total mass of the workpiece 16 can be determined during the lifting of the workpiece 16, thereby providing a double blank indication prior to the workpiece 16 coming to rest.

Figure 2:
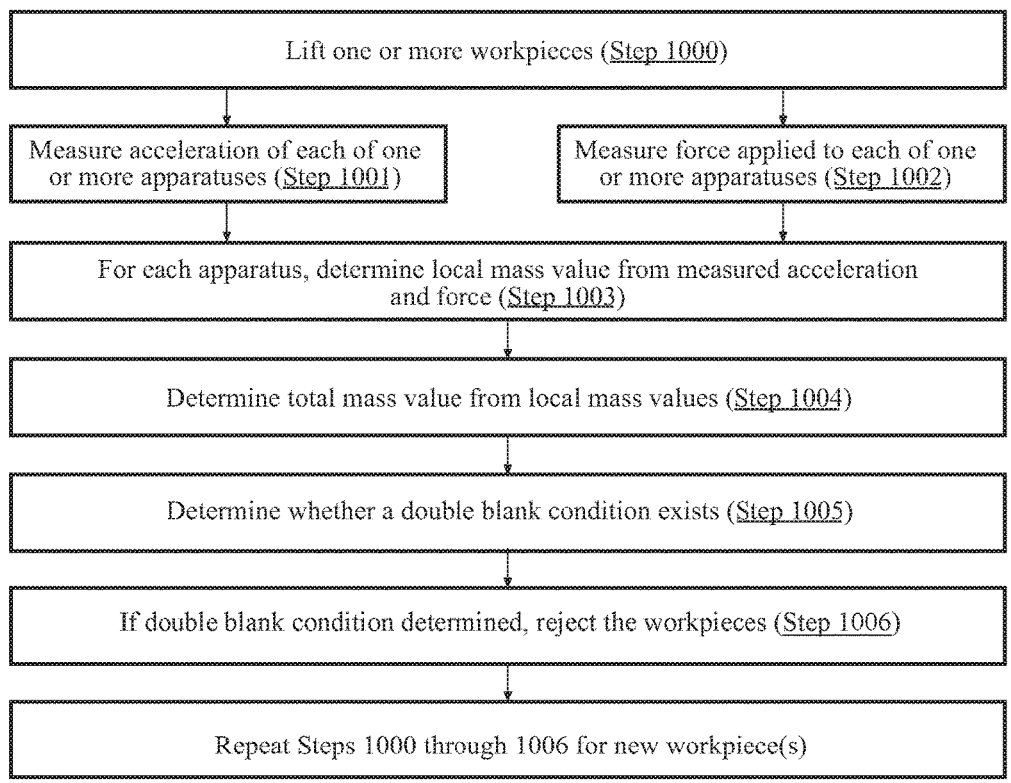
FIG. 2 is a flowchart of a method for detecting multiple workpieces with the system.

As shown schematically in FIG. 1 along with the flowchart in FIG. 2, the system 1 generally includes one or more apparatuses 10 and a central processor 35 in electrical communication therewith, and performs a method of evaluating the mass or weight of a workpiece.

The apparatuses 10, along with apparatuses 110 and 210, which are described in further structural detail below, each include a body 26 that is coupled or connected at a first end thereof to the manipulator 12 and at a second end thereof to the end-of-arm tool 14. Each end of the body 26 may be coupled directly to the manipulator 12 or end-of-arm tool 14 (e.g., with fasteners), or may be indirectly coupled thereto (e.g., by way of the force sensor 32, mount adapter 24, and/or other intermediate member, along with appropriate fasteners). The apparatus 10 may function as a coupling for mounting the end-of-arm tool 14 to the manipulator 12, such that the apparatus 10 is releasably connected to the manipulator 12, and is releasably connected to the end-of-arm tool 14, for example, allowing the apparatus 10 to be replaceable and/or repairable independent from both the manipulator 12 and the end-of-arm tool 14. The apparatus 10 may instead be fixedly coupled or otherwise with the end-of-arm tool 14, such that the end-of-arm tool 14 is part of the apparatus 10.

Each apparatus 10, along with apparatuses 110 and 210, further includes an accelerometer 28, a force sensor 32, and a processor 34 (i.e., a local processor), which are coupled to the body 26. The accelerometer 28 measures acceleration of the body 26 (e.g., the local acceleration) as the manipulator 12 moves the workpiece 16, the acceleration of the body 26 being approximately equal to the local acceleration of the workpiece 16 being lifted by the end-of-arm tool 14. The accelerometer 28 then sends a local acceleration signal 28a indicative of the measured local acceleration (i.e., communicating the local acceleration information). The local acceleration signal 28a may, for example, be a voltage output of the accelerometer 28 corresponding to the acceleration measured thereby, or may be another type of signal (e.g., outputting an actual acceleration value, a proxy thereto, or other information or data from which the acceleration can be derived). The accelerometer 28 may, for example, be a single-axis accelerometer configured to measure acceleration in only a single direction, or a three-axis accelerometer, such that acceleration in three-dimensional space can be measured and quantified. With a three-axis accelerometer, the local acceleration signal 28a may include three local acceleration signals, each associated with one of the three axes, in which case the processor 34 derives an acceleration vector within three dimensional space. Alternatively the three-axis accelerometer may, itself, derive and output vector data indicative of the acceleration within three dimensional space, or the component of acceleration substantially aligned with the load sensor 32.

The load sensor 32 measures the load applied to the apparatus 10 (e.g., the local force or load) substantially simultaneously with the accelerometer 28 measuring acceleration. The load sensor 32 then sends a local force signal 32a indicative of the measured force (i.e., communicating the local force information). As with the local acceleration signal 28a, the local force signal 32a may be a voltage output of the load sensor 32 corresponding to the force measured thereby, or may be another type of signal (e.g., outputting an actual force value, a proxy thereto, or other information or data from which the force can be derived). The load sensor 32 may be configured to measure force in a single general direction, such that bending moments, rotational torques, and shear forces applied to the apparatus 10 by the end-of-arm tool 14 have little influence on the measured force. According to other exemplary embodiments, the load sensor 32 is configured to measure force in three-axes, and may be further configured to measure rotational torque. With a three-axis force sensor, the local force signal 32a may include three local force signals, each associated with one of the three axes, in which case the processor 34 derives a force vector within three dimensional space. Alternatively the three-axis force sensor may, itself, derive and output vector data indicative of the force within three dimensional space.

According to one exemplary embodiment of the apparatus 10, the accelerometer 28 is a single-axis accelerometer and the force sensor 32 is a single-axis force sensor. The accelerometer 28 is physically arranged relative to the force sensor 32 to measure acceleration in a direction substantially the same as the direction in which the force sensor 32 measures force (e.g., directions within approximately 5 degrees of each other, or more preferably within approximately 1 degree). For example, the accelerometer 28 and force sensor 32 are configured to measure acceleration and force, respectively, in a substantially vertical direction (e.g., each within approximately 5 degrees of vertical). This singular direction of measurement may also be substantially the same as the nominal direction of movement during which the acceleration and force measurements are made.

For non-horizontal surface locations of workpieces 16 (e.g., for workpieces having varying contours or orientations), the lifting tool 14 may be coupled to the apparatus 10 at an angle corresponding to that of the non-horizontal surface location, while the accelerometer 28 and force sensor 32 are still configured to measure in a substantially vertical direction, while the workpiece 16 is moved substantially vertically. According to other exemplary embodiments, one or more apparatuses 10 of a system 1 may instead be configured to measure acceleration and force in non-vertical directions (e.g., for non-horizontal surface locations of workpieces 16) and/or in directions different from the movement direction of the workpiece 16, either of which may result in decreasing accuracy (i.e., in measurements or resultant calculations relative to actual weight or mass of a workpiece) the further the direction of measurement moves from vertical and/or from the direction of movement. However, the resultant inaccuracies may be accounted for with increased margins in target values, as discussed in further detail below. According to other exemplary embodiments of the apparatus, the accelerometer 28 is a three-axis accelerometer and the force sensor 32 is a three-axis force sensor, which provide for greater measurement and calculation accuracy by deriving acceleration and force vectors within space, which may, for example, account for non-horizontal surface locations of the workpieces 16, non-vertical movement of workpieces 16, and/or misalignment between a singular measurement direction and the direction of movement.

The processor 34 is in communication with the accelerometer 28 and load sensor 32 (e.g., physical electrical connection, or wireless connection). The term processor, as used herein, should generally be understood as a component, device, or system capable of processing signals and data (e.g., computer having a computer processor, memory, and storage), which may include multiple processor units and may further include necessary components for sending and/or receiving signals. The processor 34 receives the local acceleration signal 28a and the local force signal 32a. The processor 34 determines a local mass value based on the local acceleration signal 28a and the local force signal 32a (i.e., based on the local acceleration and force information communicated thereby). In determining the local mass, the processor 34 may also convert the local acceleration signal 28a and/or the local force signal 32a into appropriate units (e.g., from volts to m/s or Newtons). The local mass value, by being local, is the share or portion of the total mass of the workpiece(s), which is being lifted by the end-of-arm tool 14 associated with the apparatus 10. Further, the local mass value is a proxy to the actual local mass and, thereby, may be the actual local mass, the actual local weight, proxies thereto from which the actual local mass or local weight may be derived, or approximations thereto (e.g., for non-vertical acceleration and force measurements). Stated differently, the term local mass value is not necessarily a measure in units of mass (e.g., kilograms), but need only be a proxy to the actual local mass or approximation thereto and may have other units associated therewith (e.g., units of force, arbitrary units, unitless, etc.). For example, the processor may not convert a voltage output of the accelerometer signal 28a or the force signal 32a into units of acceleration or force, but may utilize voltage as a direct input variable.

As described above, the local mass value is derived from the equation M=F/A and known gravitational acceleration. For example, the processor 34 may determine the local mass value as the actual local mass $M_{local}=F_{measured}/(A_{measured}+A_{gravity})$, where $F_{measured}$ is the force measured by the force sensor 32 (e.g., a substantially vertical force) less the known weight of the end-of-arm tool 14, $A_{measured}$ is the acceleration measured by the accelerometer 28 (e.g., a substantially vertical component of the measured acceleration from a three-axis accelerometer, or the measured acceleration from a single-axis accelerometer aligned substantially vertically), and $A_{gravity}$ is the known gravitational acceleration (i.e., 9.81 m/s$^2$). The local mass value may instead be the actual local weight value calculated as $W_{local}=M_{local} \times A_{gravity}$. Alternatively, the local mass value may be the local mass or weight, or proxy thereto, of the workpiece plus the end-of-arm tool 14 coupled to the apparatus 10 (i.e., the known weight of the end-of-arm tool 14 not being subtracted from the local force measured by the force sensor 32). The processor 34 then sends, or causes to be sent, a local mass signal 34a indicative of the local mass value (i.e., a signal communicating the local mass information).

The central processor 35 is in communication with the processor 34 of each of the one or more apparatuses 10, for example, via a physical electrical connection or a wireless connection. The central processor receives the local mass signal 34a from each of the one or more apparatuses 10. The central processor 35 determines a total or cumulative mass value, for example, by adding the local mass values from each of the apparatuses 10. As with the local mass value, the total mass value may be the actual total mass, the actual total weight, any proxy thereto, or an approximation thereof.

The central processor 35 compares the total mass value to a target, which may include one or more threshold values that are based on the theoretical mass of the workpiece 16 (e.g., an upper threshold indicative of more than one workpiece and/or a lower threshold indicative of zero workpieces) or a range (e.g., a range indicative of a single workpiece 16). The target may instead be a calibrated target, for example, based on measurements (i.e., acceleration and/or force) and subsequent calculations (e.g., local and/or total mass values) from lifting of the workpiece 16. The calibration may be performed by suspending the workpiece 16 with the system 1 in a stationary manner and/or by moving the workpiece 16 with the system 1 (e.g., through expected movements during normal operation). The target may be based on the known (e.g., theoretical or calibrated) mass of a single workpiece by itself, or the known (e.g., theoretical or calibrated) combined mass of the workpiece 16 and the end-of-arm tools 14. The target may also include an error factor to account for measuring variation (e.g., between 30% and 50%), which may account for variations in movement for successive workpieces 16, as well as non-vertical acceleration and force measurements, non-vertical movement, and/or misalignment between measurement and movement directions, as described previously.

The central processor 35 then sends a system output signal 35a to a manufacturing controller M (e.g., the controller operating the manipulator 12 and the one or more end-of-arm tools 14) to accept the workpiece 16 if a double blank condition is not detected or to reject the workpiece(s) 16 if a double blank condition is determined or found. For example, the system output signal 35a may be a binary output, such as a fault signal only in instances where more than one workpiece 16 is detected, such that the workpiece(s) 16 are rejected and do not undergo further processing under a normal sequence (e.g., rejected workpieces 16 are set aside). In these double blank conditions, the controller M may, as described previously, unload the workpieces 16 in a separate unloading station, or a warning or indicator may be provided by the system 1 to a user to unload the workpieces 16. If no fault signal is produced, the workpiece 16 is accepted and undergoes further processing under a normal sequence. According to other embodiments, the system output signal may provide more discrete information, for example, providing either a pass or fault signal, the number of workpieces detected (e.g., 0, 1, 2, 3, etc.), the total mass value (e.g., total mass, total weight, or proxy thereto), etc., which may be used by the controller M in operating the manipulator 12 and end-of-arm tools 14.

While, as shown in FIG. 1, the processor 34 is depicted as a local component of each apparatus 10 and the central processor 35 is depicted as being remote to each apparatus 10, according to other exemplary embodiments, the processor 34 may be omitted such that the central processor 35 performs the steps otherwise performed by the local processor 34. The central processor receives and processes the acceleration signal 28a and the force signal 32a from each apparatus 10, while the steps of sending and receiving the local mass signals can be omitted because the local mass value and total mass value are both determined by the central processor 35. According to other exemplary embodiments, the central processor 35 and related receiving, sending, and processing steps may be omitted, for example, in systems with only one apparatus 10, in which case the local mass value would be equal to the total mass value and could be compared directly to a threshold or range. In still other exemplary embodiments, the processor 34 of one of the apparatuses 10 may function as the central processor (i.e., being electrically connected to other apparatuses 10 for receiving and processing local mass signals 34a from the other apparatuses 10 to determine the total mass value). According to still other embodiments, the system 1 may include more processors (e.g., additional intermediate processors) or fewer processors (e.g., such that the controller M directly receives the local acceleration signal 28a and the local force signals 32a).

As shown in the flowchart of FIG. 2, a method performed by the system 1 includes a first step of measuring acceleration of each apparatus (Step 1001), a second step of measuring force applied to each apparatus (Step 1002) occurring simultaneously with the first step (Step 1001), a third step of calculating the local mass value for each apparatus from the measured acceleration and measured force (Step 1003), a fourth step of determining the total mass value from the local mass values (Step 1004), and a fifth step of determining whether a double blank condition exists based on total mass value (Step 1005).

The first step of measuring acceleration (Step 1001) is performed by the accelerometer 28 of each apparatus 10 as described above. The first step of measuring acceleration (Step 1001) may also include substeps of sending the acceleration signal 28a, which is performed by the accelerometer 28, and receiving the acceleration signal 28a, which may be performed by the processor 34 in the apparatus 10 or by the central processor 35 of the system 1 (e.g., in systems 1 where the apparatus 10 does not include a processor 34, as described above).

The second step of measuring force (Step 1002) is performed by the force sensor 32 as described above and occurs substantially simultaneously with the step of measuring acceleration (Step 1001). The second step of measuring force (Step 1002) may also include substeps of sending the force signal 32a, which is performed by the force sensor 32, and receiving the force signal 32a, which may be performed by the processor 34 of the apparatus 10 or by a central processor 35 of the system 1.

The third step of calculating the local mass value (Step 1003) is performed by the processor 34 of the apparatus 10 or by the central processor 35 of the system 1 if the apparatus 10 does not include the processor 34. As described above, the local mass value is calculated based on the local acceleration information received from the acceleration signal 28a and the local force information received from the force signal 32a. The third step of calculating the local mass value (Step 1003), when performed by the processor 34 of the apparatus 10, may also include substeps of sending the local mass signal 34a indicative of the local mass value, which is performed or caused by the processor 34, and receiving the local mass signal 34a, which is performed by the central processor 35. In systems 1 omitting the processor 34 of the apparatus 10, the third step of calculating the local mass value (Step 1003) may be performed by the central processor 35 when the acceleration signal 28a and the force signal 32a are received directly therefrom.

The fourth step of calculating the total mass value (Step 1004), and the fifth step of determining whether a double blank condition exists (Step 1005) are each performed by the central processor 35. The fifth step (Step 1005) may include substeps of comparing the total mass value to a threshold or range to determine if a double blank condition exists, sending the system output signal 35a based on the determination, and accepting or rejecting the one or more workpieces based on the output signal. In systems 1 that do not include a central processor 35, the fourth and fifth steps may instead be performed by the processor 34 of the apparatus 10. For example, in systems 1 with only one apparatus 10 or in systems 1 with the processor 34 of one apparatus 10 in direct communication with the processors 34, accelerometers 28, or force sensors 32 of other apparatuses 10, the processor 34 of one apparatus may function as both a local processor and a central processor.

An overall manufacturing system, which includes the system 1 and the manipulator 12, end-of-arm tools 14, and controller M, may also perform beginning and ending steps, which include lifting one or more workpieces (Step 1000) and accepting or rejecting the one or more workpieces based on the output signal 35a (Step 1006). Steps 1000 through 1006 are then repeated for each subsequent workpiece(s) lifted by the manipulator 12 and end-of-arm tools 14.

With reference to FIGS. 3-6, various embodiments of the apparatus 10 will now be discussed. As seen in FIG. 3, the apparatus 10 of the present invention is positioned between the end-of-arm tool 14 and the manipulator 12. Although functional electronic components of the apparatus 10 (e.g., accelerometer 28, force sensor 32, and/or processor 34) of the present invention could be positioned on the manipulator 12 directly above where the end-of-arm tool 14 would connect to the manipulator 12, such a connection would require the manufacturer of the manipulator 12 to install the apparatus 10 of the present invention on the manipulator 12 prior to selling the manipulator 12 to its intended user. This would add cost to the manufacture and maintainability of the manipulator 12, and therefore, such a design would probably not be desirable for the manufacturer of the manipulator 12. The apparatus 10 of the present invention could also be mounted within the end-of-arm tool 14, but again, the end-of-arm tool 14 manufacturer would be forced to implement the apparatus 10 of the present invention into the existing end-of-arm tool 14. This would also increase the cost and maintainability of the end-of-arm tool 14. Both of these alternative mountings of the apparatus 10 of the present invention are not practical when compared to the mounting of the apparatus 10 of the present invention between the manipulator 12 and the end-of-arm tool 14, as exhibited in FIG. 3, as positioning the apparatus 10 between the manipulator 12 and the end-of-arm tool 14 allows for separate maintainability of the apparatus 10.

To connect the apparatus 10 of the present invention to the end-of-arm tool 14, such as the vacuum cup apparatus 18 shown in FIG. 3, the apparatus 10 of the present invention provides a mount adaptor 24 connected directly to the venturi 20 of the vacuum cup apparatus 18. The mount adaptor 24 has a substantially rectangular, plate-like configuration, wherein apertures (not shown) extend therethrough for allowing conventional fasteners (not shown) to extend through the apertures and into corresponding apertures (not shown) provided in the venturi 20 of the vacuum cup apparatus 18. The present invention also anticipates that the mount adaptor 24 may comprise other configurations that allow for the mounting of the end-of-arm tool 14 to the apparatus 10 of the present invention. In addition, the end-of-arm tool 14 may include various types and configurations of end-of-arm tools 14 besides the vacuum cup apparatus 18 described above, such as power actuated grippers and clamps.

In order to determine the acceleration of the workpiece 16 when being moved by the manipulator 12, a cell body 26 is connected to the mount adaptor 24. The cell body 26 has a substantially cylindrical, disc-like configuration, wherein apertures 27 in the mount adaptor 24 correspond to apertures (not shown) in the cell body 26 to allow for conventional fasteners (not shown) to extend therethrough, thereby connecting the mount adaptor 24 to the cell body 26. A conventional accelerometer 28 is disposed within the cell body 26 for measuring the acceleration of the apparatus 10 of the present invention. The manipulator 12, the apparatus 10, the end-of-arm tool 14, and the workpiece 16 are unitarily connected when the workpiece 16 is engaged by the end-of-arm tool 14, thereby allowing for a single acceleration value measured by the accelerometer 28. The accelerometer 28 is electrically connected to an electrical outlet 30 through electrical wires (not shown) such that the accelerometer 28 can send a signal corresponding to the acceleration value of the workpiece 16 to the electrical outlet 30. A slot 31 in the cell body 26 may be provided for receiving the electrical wires and providing access to the electrical outlet 30.

In order to determine the load of or force applied by the workpiece 16 (i.e., the force applied by the end-of-arm tool 14, which holds or lifts the workpiece 16, to the apparatus 10), a load cell 32 (or load or force sensor) is connected to the cell body 26 through the use of conventional fasteners (not shown). The conventional fasteners extend through corresponding apertures 29 provided in the cell body 26 and apertures 33 provided in the load cell 32. The load cell 32 may be connected to the manipulator 12 by a conventional fastener (not shown) extending from the manipulator 12 into a threaded aperture 39 provided in the load cell 32. The load cell 32 has a substantially cylindrical, disc-like configuration and has the ability to determine the load or force applied by the workpiece 16 to the load cell 32 in a conventional manner. By predetermining the load or force applied by the end-of-arm tool 14, the cell body 26, and the mount adaptor 24, the load or force of the workpiece 16 can be calculated by subtracting the load or force of the end-of-arm tool 14, the cell body 26, and the mount adaptor 24 from the total load or force measured by the load cell 32. The load cell 32 provides the load value of the workpiece 16 which is signaled through electrical wires (not shown) connected to the electrical outlet 30. The electrical outlet 30 is connected to and extends from the load cell 32. The electrical outlet 30 provides a plurality of pins 36 that are received by a corresponding cable 37 that is electrically connected to a central computer processor 35. The central computer processor 35 receives the signals from the accelerometer 28 and the load cell 32 and makes the appropriate calculations to determine whether more than one workpiece 16 is present.

According to other exemplary embodiments, the apparatus 10 may include a local processor (not shown; refer to local processor 34 above and in FIG. 1), for example, coupled to the body 26, which is electrically connected to the accelerometer 28 and force sensor 32 and calculates a local mass value based on signals received from the accelerometer 28 (i.e., acceleration signal 28a) and the force sensor 32 (i.e., the force signal 32a). The local processor is in electrical communication with the electrical outlets 30 for sending a signal indicating the local mass determined at the apparatus 10 (i.e., the local mass signal 34a) to the central processor 35.

Figure 4:
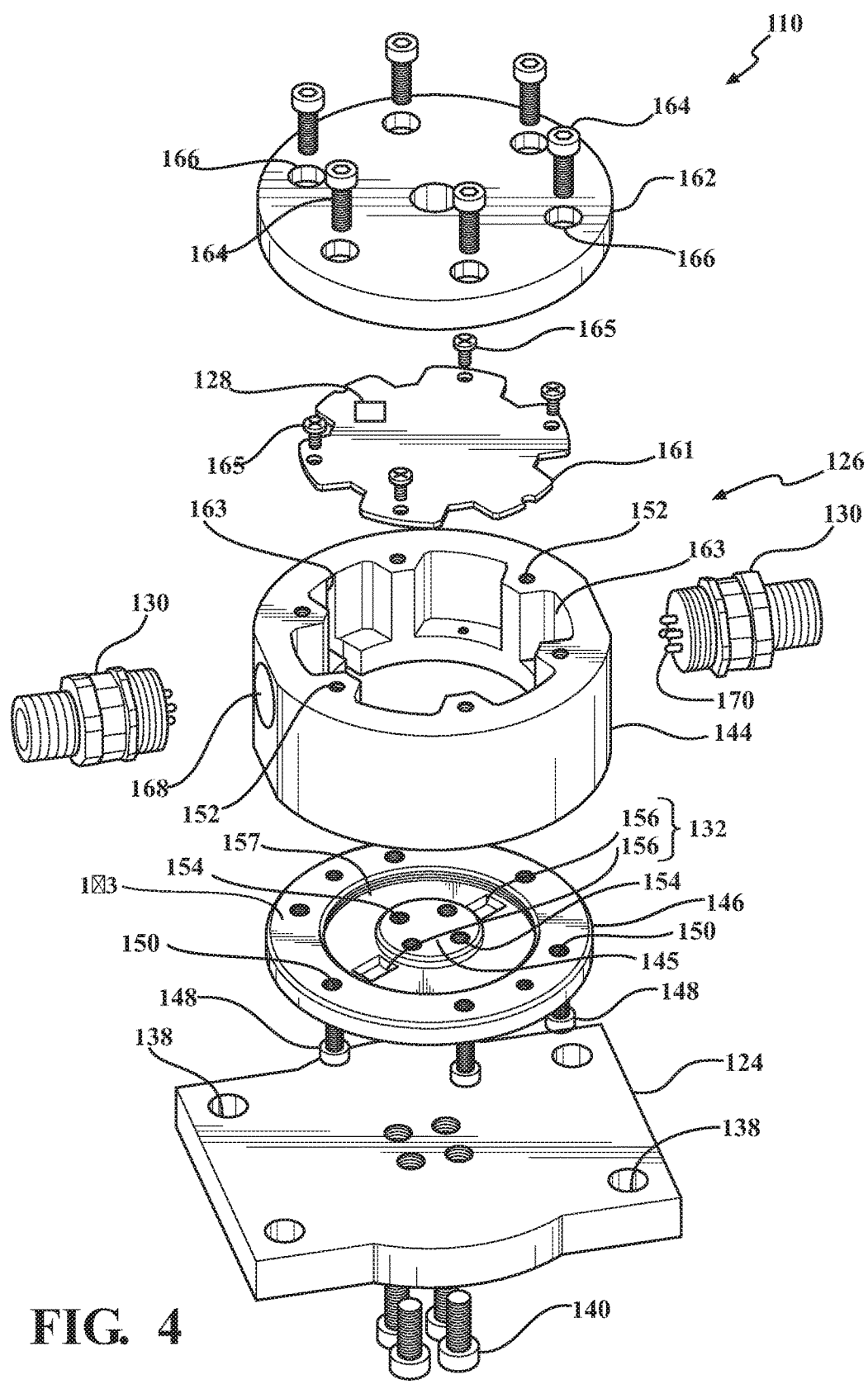
FIG. 4 is an exploded perspective view of an alternative embodiment of the apparatus for detecting multiple workpieces of the present invention.

In another embodiment, the apparatus 110 of the present invention provides an alternative configuration, as exhibited in FIG. 4. The apparatus 110 of the present invention in this embodiment provides a mount adaptor 124 that is connected to the end-of-arm tool 14, as previously described. The mount adaptor 124 has a substantially plate-like configuration having a plurality of apertures 138 extending therethrough for receiving conventional fasteners that connect the end-of-arm tool 14 to the mount adaptor 124.

The mount adaptor 124 is also connected to a cell body 126, wherein the cell body 126 has a substantially cylindrical hollow housing 144 and a substantially cylindrical diaphragm 146 connected to one end of the housing 144. The diaphragm 146 has an outer, rigid ring 143 and an inner, rigid disc 145 with a flexible recessed portion 157 extending between and connected to the ring 143 and the disc 145. Fasteners 140 extend through apertures 141 provided in the mount adaptor 124 and through corresponding apertures 154 provided in the disc 145 of the diaphragm 146 of the cell body 126 to connect the cell body 126 to the mount adaptor 124. The diaphragm 146 of the cell body 126 is connected to the housing 144 of the cell body 126 through the use of a plurality of conventional fasteners 148. The fasteners 148 extend through corresponding apertures 150 provided in the ring 143 of the diaphragm 146 and through apertures 152 provided in the housing 144 of the cell body 142. A load sensor 132 includes two pair of strain gauges 156 (only one pair shown) that are mounted on each side of the recessed portion 157 of the diaphragm 146 of the cell body 126, wherein the recessed portion 157 of the diaphragm 146 of the cell body 126 flexes in response to a load or force applied by the workpiece 16. The strain gauges 156 provide a force signal (i.e., refer to force signal 32*a* above) indicating the load or force applied to the apparatus 110 of the present invention by the workpiece 16. The strain gauges 156 are electrically connected to electrical outlets 130 mounted in the housing 144 of the cell body 126 via electrical wiring (not shown) for sending the force to the central processor (not shown; refer to central processor 35 above and in FIG. 1), or the strain gauges 156 may be connected to a circuit board 161, as will be describe later herein. Although two pair of the strain gauges 156 are described in the subject embodiment, it should be noted that the present invention is not limited to two pair of strain gauges 156, but rather, any number of strain gauges may be utilized, depending on the application.

In order to determine the acceleration of the workpiece 16, an accelerometer 128 is mounted on the circuit board 161 disposed within the housing 144 of the cell body 126. The accelerometer 128 is in electrical communication with the outlets 130 through the use of electrical wires (not shown) or electrical connections (not shown) provided on the circuit board 161. The accelerometer 128 provides an electrical signal to the outlet 130 indicating the acceleration of the workpiece 16 (i.e., refer to acceleration signal 28*a* above), which is sent to the central processor. The circuit board 161 has a substantially spoked configuration wherein the spokes of the circuit board 161 complementarily engage recesses 163 provided within the housing 144 of the cell body 126. Conventional fasteners 165 extend through apertures 167 in the circuit board 161 and apertures 169 in the housing 144 of the cell body 126 to secure the circuit board 161 to the cell body 126. A substantially cylindrical cover 162 is connected to an end of the housing 144 of the cell body 126, thereby enclosing the housing 144 of the cell body 126. The cover 162 is connected to the housing 144 of the cell body 126 by a plurality of conventional fasteners 164, which extend through corresponding apertures 166 in the cover 162 and through apertures 154 provided in the housing 144 of the cell body 126. The electrical outlets 130 are threaded into corresponding apertures 168 provided in the housing 144 of the cell body 126. The electrical outlets 130 provide a plurality of pins 170 which engage the electrical cables 137 for communicating the accelerometer signal and the load signal to the central computer processor. The apparatus 110 of the present invention may provide two electrical outlets 130 for allowing multiple apparatus 110 to be connected in series, or the apparatus 110 may provide one electrical outlet 130 for allowing each apparatus 10 to be separately connected to the central computer processor. As previously described, the central computer processor receives the accelerometer signal and the load signal and determines whether a single workpiece 16 is attached to the end-of-arm tool 14.

According to other exemplary embodiments, the apparatus 110 may include a local processor (not shown; refer to local processor 34 above and in FIG. 1), for example, coupled to the circuit board 161, which is electrically connected to the accelerometer 128 and force sensor 132 (e.g., having multiple strain gauges 156) and calculates a local mass value based on signals received from the accelerometer 128 (i.e., acceleration signal 28*a*) and the force sensor 132 (i.e., the force signal 32*a*). The local processor is in electrical communication with the electrical outlets 130 for sending a signal indicating the local mass determined at the apparatus 110 (i.e., the local mass signal 34*a*) to the central processor 35.

Figure 5:
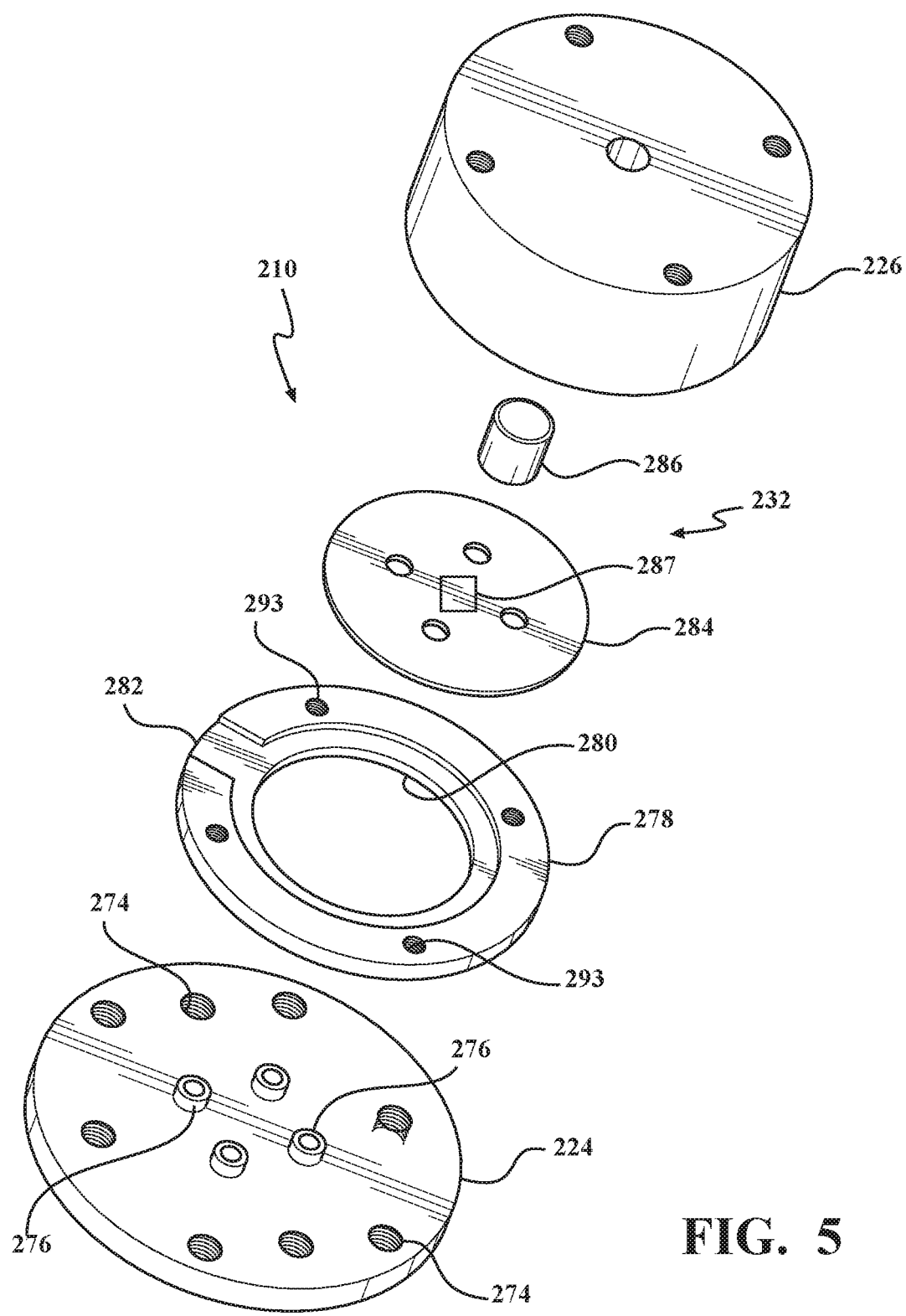
FIG. 5 is an exploded top perspective view of yet another embodiment of the apparatus for detecting multiple workpieces of the present invention.
Figure 6:
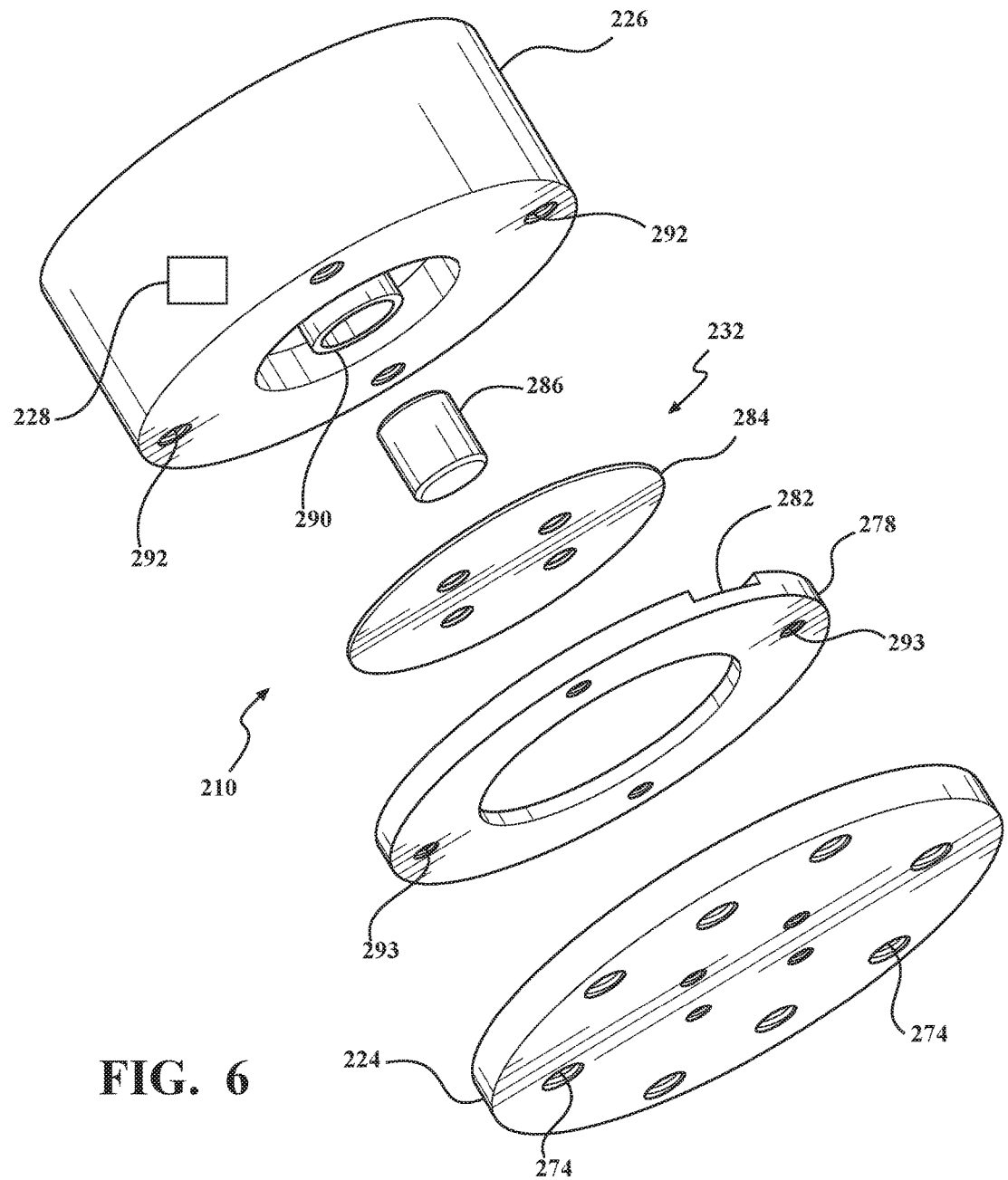
FIG. 6 is an exploded bottom perspective view of the embodiment shown in FIG. 5 of the apparatus for detecting multiple workpieces of the present invention.

In yet another embodiment, the apparatus 10 of the present invention may assume the configuration of apparatus 210 as shown in FIGS. 5-6. The apparatus 210 provides a mount adaptor 224 having a substantially cylindrical, disc-like configuration. The mount adaptor 224 is connected to the end-of-arm tool 14 through the use of conventional fasteners (not shown), which pass through corresponding apertures 274 provided in the mount adaptor 272 and through corresponding apertures (not shown) provided in the end-of-arm tool 14. The mount adaptor 224 provides four cylinders 276 which extend integrally from the mount adaptor 272 on an opposite side of the mount adaptor 224 from the end-of-arm tool 14. The four cylinders 276 are positioned in a substantially square configuration. To measure the weight of the workpiece 16 engaged by the end-of-arm tool 14, a bottom shelf 278 is seated on and adjacent the mount adaptor 224. The bottom shelf 278 provides a substantially cylindrical ring having a stepped inner diameter 280 and a recessed keyway 282 extending from the stepped inner diameter 280. A substantially cylindrical, disc-like diaphragm 284 is seated within the stepped inner diameter 280 of the bottom shelf 278. The cylinders 276 of the mount adaptor 272 limit the possible deflection of the diaphragm 284 by providing a positive stop to the diaphragm 284. A force sensor 232 includes a strain gauge 287 that is mounted on the diaphragm 284 and is utilized to monitor the deflection of the diaphragm 284. The strain gauge 287 sends an electrical signal (i.e., refer to the force signal 32*a* above) via electrical wires (not shown) to an electrical outlet (not shown) to indicate the load value or force applied by the workpiece 16. The keyway 282 provides access to the electrical wires from the strain gauge to the electrical outlet.

The diaphragm 284 flexes in light of the load or force applied by a substantially cylindrical plunger 286. The plunger 286 is disposed within a substantially cylindrical recess 290 provided in a substantially cylindrical cell body 226. The cell body 226 has four apertures 292 extending therethrough which correspond to apertures 293 provided in the bottom shelf 278 and to the apertures 274 in the mount adaptor 224. Conventional fasteners (not shown) extend through the apertures 292 of the cell body 226, the apertures 293 in the bottom shelf 278, and the aperture 274 in the mount adaptor 224 for connecting the cell body 226 to the bottom shelf 278 and the mount adaptor 224. The plunger 286 is allowed to freely slide within the cylindrical recess 290 of the cell body 226 so as to allow the plunger 286 to engage and flex the diaphragm 284 in an amount that corresponds to the load or force applied by the workpiece 16. Electrical wires (not shown) lead from the strain gauge 287 of the force sensor 232 to an electrical outlet (not shown) to provide a signal to the central computer processor (not shown; refer to central processor 35 above and in FIG. 1) indicating the force applied to the apparatus 210.

In order to measure the acceleration of the workpiece 16, an accelerometer 228 is mounted within or otherwise coupled to the cell body 226 of the apparatus 210 of the present invention. Electrical wires (not shown) lead from the accelerometer 228 to the electrical outlet (not shown) to provide a signal (i.e., refer to acceleration signal 28a above) to the central computer processor indicating the acceleration of the workpiece 16. The processor receives the acceleration value and the load value and calculates the weight of the workpiece 16, as described previously.

According to other exemplary embodiments, the apparatus 210 may include a local processor (not shown; refer to local processor 34 above and in FIG. 1), for example, coupled to the body 226, which is electrically connected to the accelerometer 228 and force sensor 232 (e.g., having multiple strain gauges 232) and calculates a local mass value based on signals received from the accelerometer 228 (i.e., acceleration signal 28a) and the force sensor 232 (i.e., the force signal 32a). The local processor is in electrical communication with electrical outlets (not shown) for sending a signal indicating the local mass determined at the apparatus 210 (i.e., the local mass signal 34a) to the central processor 35.

Although the apparatus 10 and method of the present invention is ideally suited for determining whether an end-of-arm tool 14 has engaged and lifted more than one workpiece 16, it is anticipated that the apparatus 10 and method of the present invention may be used to determine the presence or lack of any load that is lifted by the apparatus 10 and method of the present invention. For instance, the number of workpieces or the quantity of a filling could be determined in any container where comparative masses can be utilized.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for detecting workpieces, the apparatus comprising:
   a body having a first end configured to couple to a manipulator and having a second end configured to couple to a lifting tool;
   an accelerometer coupled to the body, the accelerometer being configured to measure local acceleration of the body and send a local acceleration signal indicative of the local acceleration;
   a force sensor coupled to the body, the force sensor being configured to measure local force applied to the body by the lifting tool and send a local force signal indicative of the local force.

2. The apparatus of claim 1 further comprising a local processor, wherein the local processor is coupled to the body and electrically connected to the accelerometer and the force sensor to receive the local acceleration signal and the local force signal, the local processor being configured to determine a local mass value based on the local acceleration signal and the local force signal, and to send a local mass signal indicative of the local mass value.

3. The apparatus according to claim 1, wherein the local mass value is a proxy to a local mass of one or more workpieces currently being lifted by the lifting tool.

4. The apparatus according to claim 1, wherein the force sensor is configured to measure force in a single direction, and the accelerometer is configured to measure acceleration substantially in the single direction.

5. The apparatus according to claim 4, wherein the accelerometer is one of a three-axis accelerometer or a single-axis accelerometer, and wherein the force sensor comprises a load cell.

6. The apparatus according to claim 1, wherein the accelerometer and the force sensor are configured to simultaneously measure the acceleration and the force, respectively.

7. The apparatus according to claim 6, wherein the accelerometer and the force sensor are configured to measure the acceleration and the force, respectively, while the manipulator moves the lifting tool.

8. The apparatus according to claim 1, further comprising the lifting tool, the body being coupled to the lifting tool.

9. The apparatus according to claim 1, wherein the apparatus is configured as a coupling for mounting the lifting tool to the manipulator, the first end being configured to releasably connect to the manipulator and the second end being configured to releasably connect to the lifting tool.

10. The apparatus according to claim 1, wherein the body is at least one of configured to couple at the first end to the manipulator by way of the force sensor, or configured to couple at the second end to the lifting tool by way of the force sensor.

11. A manufacturing system for evaluating one or more workpieces lifted by a manipulator with a plurality lifting tools, the manufacturing system comprising:
    a plurality of apparatuses, each apparatus comprising:
       a body having a first end configured to couple to the manipulator and having a second end configured to couple to the lifting tool;
       an accelerometer coupled to the body, the accelerometer being configured to measure local acceleration of the body and send a local acceleration signal indicative of the local acceleration; and
       a force sensor coupled to the body, the force sensor being configured to measure local force applied to body by the lifting tool and send a local force signal indicative of the local force; and
    one or more processors configured to determine a local mass value for each apparatus based on the local acceleration signal and the local force signal, and to determine a total mass value according to the local mass values of each apparatus.

12. The manufacturing system according to claim 11, wherein the one or more processors comprise a plurality of local processors, and each apparatus includes one of the local processors coupled to the body thereof and electrically connected to the accelerometer and the force sensor thereof to receive the local acceleration signal and the force acceleration signal; and
    wherein each local processor is configured to determine the local mass value of the apparatus based on the local acceleration signal and the local force signal, and to send a local mass signal indicative of the local mass value.

13. The manufacturing system according to claim 12, wherein the one or more processors comprise a central processor configured to receive the local mass signals from each local processor of each apparatus, the central processor being configured to determine the total mass value.

14. The manufacturing system according to claim 13, wherein the central processor is configured to compare the total mass value to a target to make a determination of whether more than one workpiece is currently being lifted by the plurality of lifting tools, and to send an output signal indicative of the determination.

15. The manufacturing system according to claim 11, wherein the one or more processors includes a central processor configured to receive the local acceleration signal and the local force signal from the accelerometer and the force sensor of each apparatus, and to determine the total mass value.

16. The manufacturing system according to claim 11, wherein the total mass value is a proxy to a total mass of one or more workpieces currently being lifted by the plurality of lifting tools.

17. The manufacturing system according to claim 11, further comprising the manipulator and the plurality of lifting tools, each apparatus being coupled to the manipulator and one of the lifting tools, wherein the manufacturing system is configured to reject one or more workpieces currently being lifted by the plurality of lifting tools if the total mass value does not meet a target.

18. The manufacturing system according to claim 11, wherein each apparatus is configured as a coupling for mounting the lifting coupled thereto to the manipulator, the first end of the apparatus being configured to releasably couple to the manipulator and the second end being configured to releasably couple to the manipulator.

19. The manufacturing system according to claim 11, wherein the body of each apparatus is at least one of configured to couple at the first end to the manipulator by way of the force sensor, or configured to couple at the second end to the lifting tool by way of the force sensor.

20. A method of processing one or more workpieces with a manipulator and a plurality of lifting tools mounted to the manipulator via an apparatus, the method comprising:

for each lifting tool, measuring a local acceleration using an accelerometer and a local force using a force sensor during movement of the one or more workpieces being moved by the lifting tools, the accelerometer and the force sensor being coupled to the body of the apparatus;

for each lifting tool, determining a local mass value based on the local acceleration and the local force;

determining a total mass value by adding the local mass value for each lifting tool;

comparing the total mass value to a target to make a determination of whether more than one workpiece is currently being lifted by the lifting tools; and if it is determined that more than one workpiece is currently being lifted, rejecting the workpieces currently being lifted.

* * * * *